April 21, 1959 E. V. SCHNEIDER 2,883,567
BRUSH HOLDER STRUCTURE
Filed May 21, 1956

INVENTOR.
EMMOR V. SCHNEIDER
BY Woodling and Krost,
       attys.

United States Patent Office 2,883,567
Patented Apr. 21, 1959

2,883,567

BRUSH HOLDER STRUCTURE

Emmor V. Schneider, Alliance, Ohio, assignor to The Alliance Manufacturing Company, Division of Consolidated Electronics Industries Corporation, Wilmington, Del.

Application May 21, 1956, Serial No. 586,295

7 Claims. (Cl. 310—247)

The invention relates in general to brush holders and more particularly to a novel brush holder structure combining several features and which may be used in connection with any electrical apparatus utilizing electrical contact brushes such as a dynamoelectric machine.

The invention has especial use with miniature motors of the subfractional horsepower ratings. Many different forms of such miniature motors have been made and many have been very cheaply constructed. The present invention relates to the brush holder construction of motors and particularly small motors, yet ones which are capable of continuous duty operation rather than intermittent duty and hence all parts must be well constructed even though of small size. The present invention achieves such objective, yet the brush holder construction is simple and economical to manufacture yet found to be completely reliable and dependable in operation.

Electrical terminal connections must be made to the brushes contained within the brush holders, and an object of the invention is to provide good electrical connection from a terminal to the brush within the brush holder.

Still another object of the invention is to provide a brush holder and terminal construction in two parts with a tubular member adapted to contain the brush and a separate spring member in spring-tight engagement with the brush holder and acting as a combined brush retainer and terminal.

Still another object of the invention is to provide a brush holder construction wherein a separate stamped sheet metal part as a brush retainer is simply and easily constructed and assembled, yet which brush retainer incorporates a plurality of features including a terminal for electrical connection, a hold-down tab to hold the retainer in place, a spring tab to hold the brush spring in place, and interengaging tabs to hold the brush holder within the housing of the motor.

Still another object of the invention is to provide a brush holder structure which includes a longitudinal metallic body electrically and physically engaging the brush holder and which body has arm means a part or parts of which provide an electrical terminal, provide a means to hold the brush holder in the housing of the motor, and providing a means to hold a brush spring within the brush holder.

Other objects and a fuller understanding of this invention may be had by referring to the following description and claims, taken in conjunction with the accompanying drawing, in which:

Figure 1:
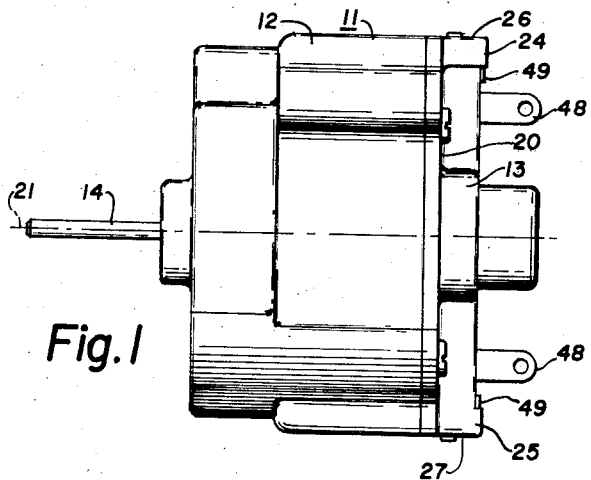
Figure 1 is a side elevational view of a motor assembly incorporating the brush holder structure of the invention.
Figure 2:
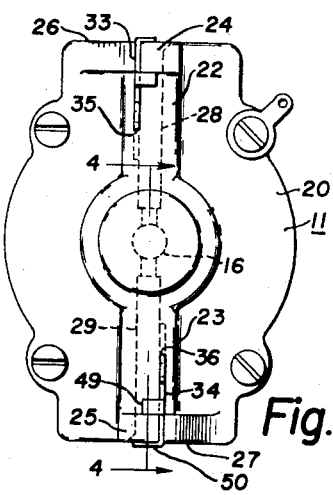
Figure 2 is an end view of the motor of Figure 1.

The brush holder structure of the invention may be utilized in any electrical apparatus requiring electrical contact brushes for cooperation with a moving part and for purposes of illustration has been shown in the drawing as incorporated in a small motor 11 which is one form of dynamoelectric machine. The motor 11 has a casing or housing 12, an end bell 13, a shaft 14 journalled in a bearing 15 which shaft has the usual rotor, not shown, and carries a commutator 16. This commutator is one form of current collecting device with which the brush holder structure 17 may be used.

The end bell 13 may be molded of some insulating material as a convenient means of fabrication, and this end bell has an end surface 20 generally perpendicular to the axis 21 of the shaft 14. First and second cylindrical or humped surfaces 22 and 23 are disposed generally diametrically opposite on the outer surface of the end surface 20. Raised shoulders 24 and 25 are provided on the outer ends of these humped surfaces 22 and 23 adjacent flat peripheral side surfaces 26 and 27, which surfaces are generally parallel and parallel to the axis 21. First and second apertures 28 and 29, which in this case are shown as square apertures, are provided diametrically opposed in the humped surfaces 22 and 23. The ends of the apertures 28 and 29 are chamfered or reamed at 30 to provide an enlarged entrance opening at the outer axial end of these apertures 28 and 29.

Figure 4:
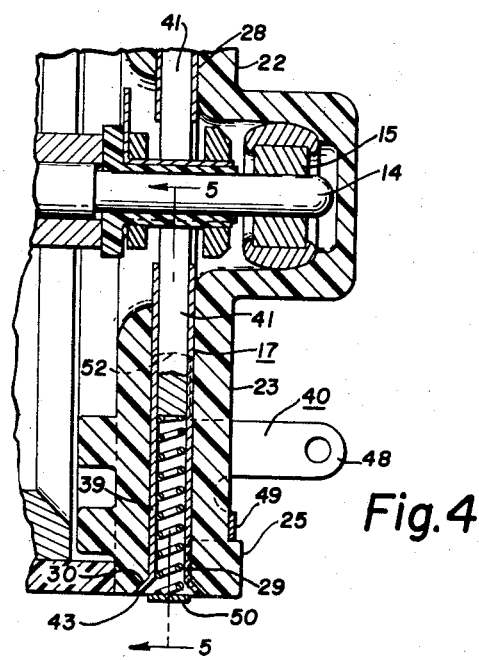
Figure 4 is an enlarged sectional view on the line 4—4 of Figure 2.
Figure 3:
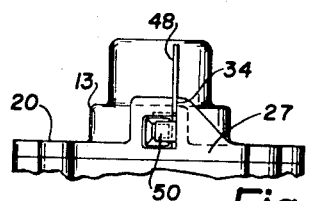
Figure 3 is a partial side view of the motor of Figures 1 and 2.
Figure 5:
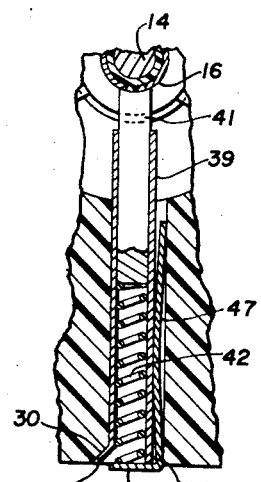
Figure 5 is a sectional view on the line 5—5 of Figure 4.

Slotted or slot-like apertures 33 and 34 extend inwardly from the peripheral side surfaces 26 and 27 to a point about midway of the length of the square apertures 28 and 29. These slotted apertures extend along one side of the square apertures 28 and 29, and hence are slightly off center of a longitudinal plane through the motor 11. The raised shoulders 24 and 25 are outboard of the inner ends 35 and 36 of the slotted apertures 33 and 34. The brush holder structure includes generally two parts which in this preferred embodiment have been shown as two separate parts including primarily a brush holder 39 and a brush retainer 40. The brush holder 39 is adapted to contain an electrical contact brush 41 which is adapted to be urged against the commutator 16 by a spring 42, shown as a coil compression spring. The brush holder 39 should be so shaped as to engage a relatively large surface area of the brush 41 and for this purpose has been illustrated as being tubular. In this embodiment it is shown as being square metallic tubing and is typically made of copper or of copper alloys in order to provide good electrical conductivity. The outer end 43 of the brush holder 39 has been enlarged by bending outwardly at about a forty-five degree angle three sides of this square metallic tubing, as best shown in Figures 3, 4, and 5. The fourth side 44 of the outer end of the brush holder 39 is preferably left straight.

Figure 6:
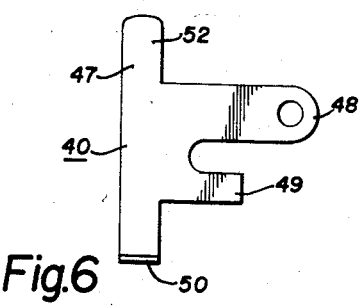
Figures 6 and 7 are plan and side views of the brush retainer.
Figure 7:
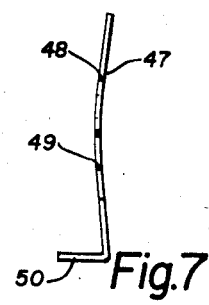

The brush retainer 40 actually incorporates four different features in a simple yet economically manufactured and assembled unit. This brush retainer 40 is separately shown in Figures 6 and 7 and has a longitudinal metallic body 47 which, as shown in Figure 7, is bowed to act as a spring. This brush retainer may be made of some material such as phosphor bronze so as to be a good electrical conductor and to have a spring temper to have a tendency to retain its shape even though flexed. This brush retainer 40 has a plurality of arms or arm means including a terminal arm or lug 48, a hold-down tab 49, and a spring tab 50. The Figures 4 and 5 show the brush retainer 40 and brush holder 39 in place in the assembled motor and show that the brush retainer 40 is wedged in spring-tight engagement between the brush holder 39 and a side wall of the square aperture 29.

In assembly the brush holder 39 is axially inserted in the square aperture 28 or 29, the brush 41 and then the spring 42 inserted, and next the brush retainer 40 is inserted lengthwise alongside the brush holder 39. The forward end 52 of the brush retainer will extend to a point inboard of the inner ends 35 and 36 of the slotted apertures 33 and 34. This, together with the spring tension of the brush retainer 40, prevents outward axial movement of this brush retainer 40. The brush retainer is inserted until the spring tab 50 strikes the end of the fourth side 44. Next, the hold-down tab 49 is bent at approximately right angles until it lies adjacent and inboard of the raised shoulder 25. The spring tab 50 thus forms an abutment for the outer end of the spring 42 to retain the brush and spring within the brush holder 39. Still further, the combined cooperation of the hold-down tab 49 engaging the shoulders 24 or 25 plus the engagement of the spring tab 50 with the fourth side 44 of the brush holder, retains the brush holder 39 within the square apertures 28 or 29.

After assembly, the spring tab 50 may be tack soldered to the outer end of the brush holder 39, if desired, and this will provide a positive inter-connection between the brush retainer 40 and the brush holder 39 to additionally provide a positive means preventing movement of the brush retainer 40 axially of the motor.

The terminal lug 48 may be any form of terminal such as a solder lug; and therefore, when any conductor is connected thereto, there is good electrical contact provided from such conductor through the brush retainer and the brush holder 39 to the brush 41, because of the high electrical conductivity plus the fact that the brush retainer and brush holder are in spring-tight engagement. In the brush retainer 40 the longitudinal body 47 is not only in electrical contact but in physical engagement with the brush holder 39 to prevent outward movement of the brush holder and also of the combined brush retainer, terminal, and spring retainer 50. In the brush retainer also the longitudinal body 47 has arm means, a part of which extends through the slotted aperture 33 or 34, a part of which provides a terminal 48, a part of which provides spring retaining means 50, and a part of which 49 and 50 provide a brush holder retaining means. Therefore, the brush retainer which is a simple stamped sheet metal piece provides the four functions aforementioned, yet it is very, simply and economically assembled into the complete motor. Should brush replacement be necessary, it is merely necessary to slightly raise the hold-down tab 49 and the entire brush holder structure 17, including the brush holder 39 and brush retainer 40, may be withdrawn from the square aperture 28 or, if the brush retainer 40 and brush holder 39 are not soldered or fastened together, only the brush retainer 40 may be withdrawn so that the spring and brush may be removed. Upon a new brush being inserted and the spring reinserted, the brush retainer 40, together with the brush holder 39 if removed, may again be placed in position in the square aperture and the hold-down tab 49 again bent down behind the raised shoulder 25.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A brush holder and terminal for a dynamoelectric machine housing comprising; a surface defining a square aperture in said housing perpendicular to the axis thereof; a slot-like aperture extending to the exterior of said housing and merging with said square aperture for a portion of the outer end thereof; a raised exterior shoulder on the exterior of said housing adjacent the outer end of said slot-like aperture; a brush holder comprising, a square metallic tube positioned within said square aperture; an electrical contact brush within said brush holder at the inboard end thereof; a spring outboard of said brush and bearing against the outer end thereof; and a one-piece terminal comprising, a metallic longitudinal body and lateral arm means, said longitudinal body being wedged between one wall of said square aperture and said brush holder, a part of said arm means extending through said slot-like aperture to the exterior of said housing, a part of said arm means providing a solder lug for said terminal, a part of said arm means engaging said exterior shoulder to prevent radially outward movement of said terminal, a part of said arm means engaging the outer end of said spring to prevent outward movement thereof, and a part of said arm means engaging the outer end of said brush holder to prevent the outward movement thereof.

2. An end bell construction for an electric motor having an axis and having a rotor with a commutator disposed on the axis, an end surface perpendicular to said axis on said end bell, first and second side peripheral surfaces on said end bell disposed generally parallel to each other and to said axis, two raised shoulders on said end surface adjacent said side peripheral surfaces, first and second surfaces defining square apertures in said end bell diametrically opposed and perpendicular to said axis, first and second brush holders made of square metallic tubing inserted in said apertures, an enlarged outer end on each said brush holder engaging a part of said side peripheral surface to limit inward movement of said brush holders, first and second brushes in the inner ends of said brush holders adapted to bear against a commutator of the motor, first and second coil compression springs outboard of said brushes and bearing against the outer ends of said brushes, a slot-like aperture extending along one side of each said square aperture from the side peripheral surfaces at the outer axial end of each said square aperture to a point considerably inboard of said raised shoulder, and first and second combined brush holder retainers and terminals comprising, a metallic body, means for electrically connecting and physically engaging said body to said brush holder, a spring tab integrally attached on the outboard end of said metallic body bent at approximately right angles thereto and overlying the open end of said square tubing to retain said spring within said tubing, a solder lug and a hold-down tab integrally attached to one side of each said metallic body and projecting outwardly therefrom at right angles and initially in the plane of the body through said slot-like aperture, said hold-down tabs being bent at approximately right angles to said longitudinal body and disposed adjacent to and inboard of said shoulders, and the cooperation of said hold-down tabs with said shoulders plus the engagement of said body with said brush holder establishing the retention of said brush holders and brush holder retainers within said square apertures.

3. An end bell construction for an electric motor having an axis and having a rotor with a commutator disposed on the axis, an end surface perpendicular to said axis on said end bell, a radially disposed humped surface perpendicular to said axis and axially outboard of said end surface, a side peripheral surface on said end bell disposed generally parallel to said axis, a raised shoulder on the outer extremity of said humped surface adjacent said side peripheral surface, a surface defining a square aperture in said humped surface perpendicular to said axis, a brush holder made of square electrically conductive metallic tubing inserted in said aperture, an enlarged outer end on said brush holder engaging a part of said side peripheral surface to limit inward movement of said brush holder, a brush in the inner end of said brush holder adapted to bear against a commutator of the motor, a coil compression spring in said brush holder outboard of said brush and bearing against the outer end of said brush, a slot-like aperture in said end bell humped surface extending along one side of said square aperture from said side peripheral surface at the outer axial end of said square aperture to a point considerably inboard of said raised shoulder, and a stamped sheet metal spring and brush holder retainer and terminal in said slot-like aperture and comprising, an electrically conductive metallic longitudinal body disposed in tight engagement with each said brush holder between said brush holder and one side of said square aperture and in alignment with said slot-like aperture, a spring tab integrally attached on the outboard end of said longitudinal body bent at approximately right angles thereto and overlying one side wall of and the open end of said square tubing to retain said spring within said tubing, a solder lug and a hold-down tab each integrally attached to one side of said longitudinal body and projecting outwardly therefrom at right angles through said slot-like aperture and initially in the plane of the body, said hold-down tab being outboard of said solder lug and being bent at approximately right angles to said longitudinal body and disposed adjacent to and inboard of said shoulder, and the cooperation of said hold-down tab with said shoulder plus the engagement of said spring tab with one side wall of the end of the square tubing establishing the retention of said brush holder and terminal within said square aperture.

4. An end bell construction for an electric motor having an axis and having a rotor with a commutator disposed on the axis, an end surface perpendicular to said axis on said end bell, first and second side peripheral surfaces on said end bell disposed generally parallel to each other and to said axis, two raised shoulders on said end surface adjacent said side peripheral surfaces, first and second surfaces defining square apertures in said end bell diametrically opposed and perpendicular to said axis, first and second brush holders made of square metallic tubing inserted in said apertures, an enlarged outer end on each said brush holder engaging a part of said side peripheral surface to limit inward movement of said brush holders, first and second brushes in the inner ends of said brush holders adapted to bear against a commutator of the motor, first and second coil compression springs outboard of said brushes and bearing against the outer ends of said brushes, a slot-like aperture extending along one side of each said square aperture from the side peripheral surfaces at the outer axial end of each said square aperture to a point considerably inboard of said raised shoulder, and first and second brush holder retainers comprising, a metallic longitudinal body disposed in tight engagement with each said brush holder between said brush holder and one side of said square aperture and in alignment with said slot-like aperture, a spring tab integrally attached on the outboard end of said longitudinal body bent at approximately right angles thereto and overlying one side wall of and the open end of said square tubing to retain said spring within said tubing, a terminal arm and a hold-down tab integrally attached to one side of each said longitudinal body and projecting outwardly therefrom at right angles and initially in the plane of the body through said slot-like aperture, said hold-down tabs being bent at approximately right angles to said longitudinal body and disposed adjacent to and inboard of said shoulders, and the cooperation of said hold-down tabs with said shoulders plus the engagement of said spring tabs with one side wall of the ends of the square tubing establishing the retention of said brush holders and brush holder retainers within said square apertures.

5. An end bell construction for an electric motor having an axis and having a rotor with a commutator disposed on the axis, an end surface perpendicular to said axis on said end bell, first and second diametrically opposed humped surfaces perpendicular to said axis and axially outboard of said end surface, first and second side peripheral surfaces on said end bell and humped surfaces disposed generally parallel to each other and to said axis, a raised shoulder on the outer extremity of each humped surface adjacent said side peripheral surfaces, first and second surfaces defining square apertures in said humped surfaces diametrically opposed and perpendicular to said axis, first and second brush holders made of square electrically conductive metallic tubing inserted in said apertures, an enlarged outer end on each said brush holder engaging a part of said side peripheral surface to limit inward movement of said brush holders, first and second brushes in the inner ends of said square tubes adapted to bear against a commutator of the motor, first and second coil compression springs in said brush holders outboard of said brushes and bearing against the outer ends of said brushes, a slot-like aperture in each said end bell humped surface extending along one side of said square apertures from the side peripheral surfaces at the outer axial end of each said square aperture to a point considerably inboard of said raised shoulder, and a stamped sheet metal spring and brush holder retainer and terminal in each slot-like aperture and comprising, an electrically conductive metallic longitudinal body disposed in spring-tight engagement with each said brush holder between said brush holder and one side of said square aperture and in alignment with said slot-like aperture, a spring tab integrally attached on the outboard end of said longitudinal body bent at approximately right angles thereto and overlying one side wall of and the open end of said square tubing to retain said spring within said tubing, a solder lug and a hold-down tab each integrally attached to one side of each said longitudinal body and projecting outwardly therefrom at right angles through said slot-like aperture and initially in the plane of the body, said hold-down tabs being outboard of said solder lugs and being bent at approximately right angles to said longitudinal body and disposed adjacent to and inboard of said shoulders, and the cooperation of said hold-down tabs with said shoulders plus the engagement of said spring tabs with one side wall of the ends of the square tubing establishing the retention of said brush holders and terminals within said square apertures.

6. A brush holder and terminal for a dynamoelectric machine housing comprising, a surface defining a first aperture in said housing perpendicular to the axis thereof, a slot-like aperture in said housing extending to the exterior thereof and merging with said first aperture for a portion of the outer end thereof, a raised exterior shoulder on said housing adjacent the outer end of said slot-like aperture, a brush holder positioned within said first aperture, and a one-piece terminal comprising, a longitudinal metallic body and lateral arm means, said longitudinal body being wedged between the wall of said first aperture and said brush holder, a part of said arm means extending through said slot-like aperture to the exterior of said housing, a part of said arm means providing a solder lug for said terminal, a part of said arm means engaging said exterior shoulder to prevent radially outward movement of said terminal, a part of said arm means engaging the outer end of said brush holder, and a part of said arm means providing an exterior electrical connection to said terminal.

7. A brush holder and terminal for a dynamoelectric machine housing comprising, a surface defining a first aperture in said housing perpendicular to the axis thereof, a slot-like aperture in said housing merging with said first aperture for a portion of the outer end thereof, a raised shoulder on said housing adjacent the outer end of said slot-like aperture, a brush holder comprising a metallic tube positioned within said first aperture, and a one-piece terminal comprising, a longitudinal metallic body and lateral arm means, said longitudinal body being wedged between the wall of said first aperture and said brush holder, a part of said arm means extending through said slot-like aperture, a part of said arm means providing a solder lug for said terminal, a part of said arm means engaging said shoulder to prevent radially outward movement of said terminal, a part of said arm means engaging the outer end of said brush holder, and a solder connection between the outer end of said brush holder and the part of said arm means engaging same to prevent outward movement of said one-piece terminal axially of said housing.

References Cited in the file of this patent
UNITED STATES PATENTS

| | | |
|---|---|---|
| 2,348,684 | Perkins | May 9, 1944 |
| 2,444,826 | Happe | July 6, 1948 |